United States Patent [19]

Heath et al.

[11] 4,006,482

[45] Feb. 1, 1977

[54] PATTERN PRINTING APPARATUS

[75] Inventors: Christopher Edmund James Heath; Anthony David Paton; David Anthony Reeve, all of Cambridge, England

[73] Assignee: Imperial Chemical Industries Limited, London, England

[22] Filed: May 1, 1975

[21] Appl. No.: 573,605

[30] Foreign Application Priority Data

May 6, 1974 United Kingdom ............. 19809/74

[52] U.S. Cl. ............................................ 346/75

[51] Int. Cl.[2] ........................................ G01D 15/18

[58] Field of Search .................................. 346/75, 1

[56] References Cited

UNITED STATES PATENTS

| | | | |
|---|---|---|---|
| 3,298,030 | 1/1967 | Lewis et al. | 346/75 |
| 3,588,906 | 6/1971 | Van Brimer | 346/75 X |
| 3,739,395 | 6/1973 | King | 346/75 |
| 3,911,818 | 10/1975 | MacIlvane | 346/75 X |

*Primary Examiner*—George H. Miller, Jr.
*Attorney, Agent, or Firm*—Cushman, Darby & Cushman

[57] ABSTRACT

An improved droplet printing apparatus of the type wherein a succession of ink droplets directed at regular intervals along the same flight path may be individually charged to one of a plurality of charge levels by application of a voltage waveform of constant period to groups of drops. Each charged drop is deflected from the common flight path by passage through an electric field, to an extent dependent on the charge carried so that during relative motion between the apparatus and a surface to be printed ink drops may be deposited on the surface in successive rows extending transversely to the direction of relative motion; all ink drops not being required for deposition being directed into a drop intercepting means. The improvement comprises the provision of means for introducing a delay between adjacent voltage waveforms and means for directing all drops formed during such delay into the drop intercepting means.

1 Claim, 3 Drawing Figures

PATTERN PRINTING APPARATUS

Figure 1:
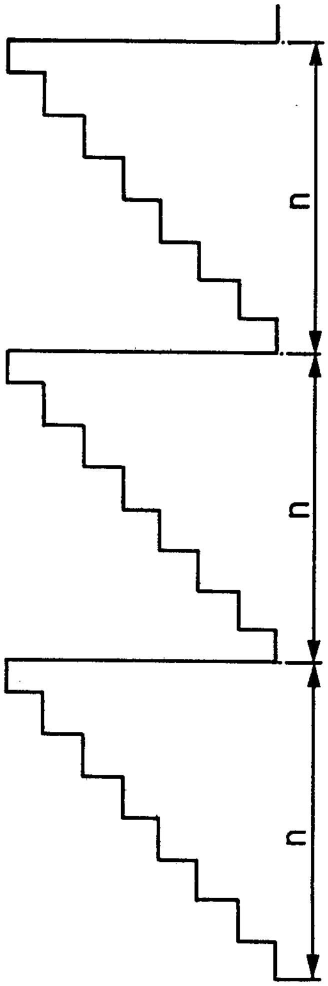
PRIOR ART FIGURE 1
Figure 2:
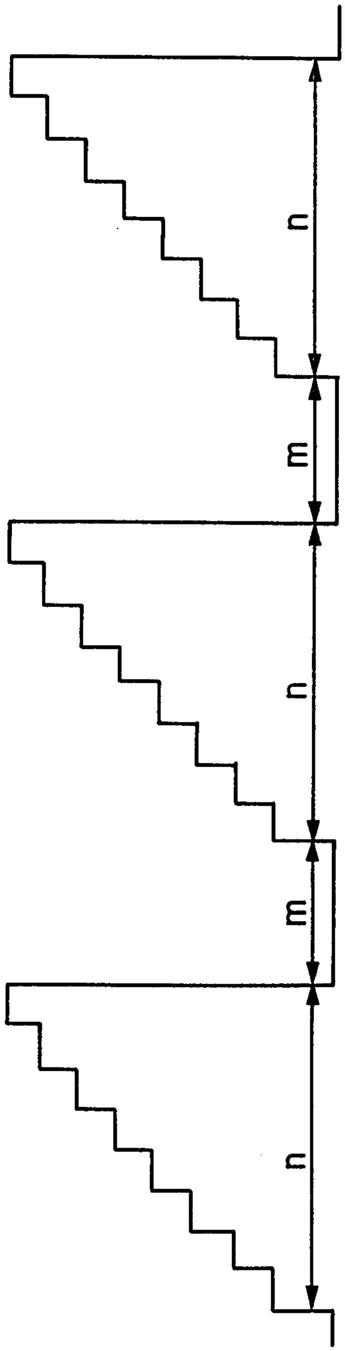
Figure 3:
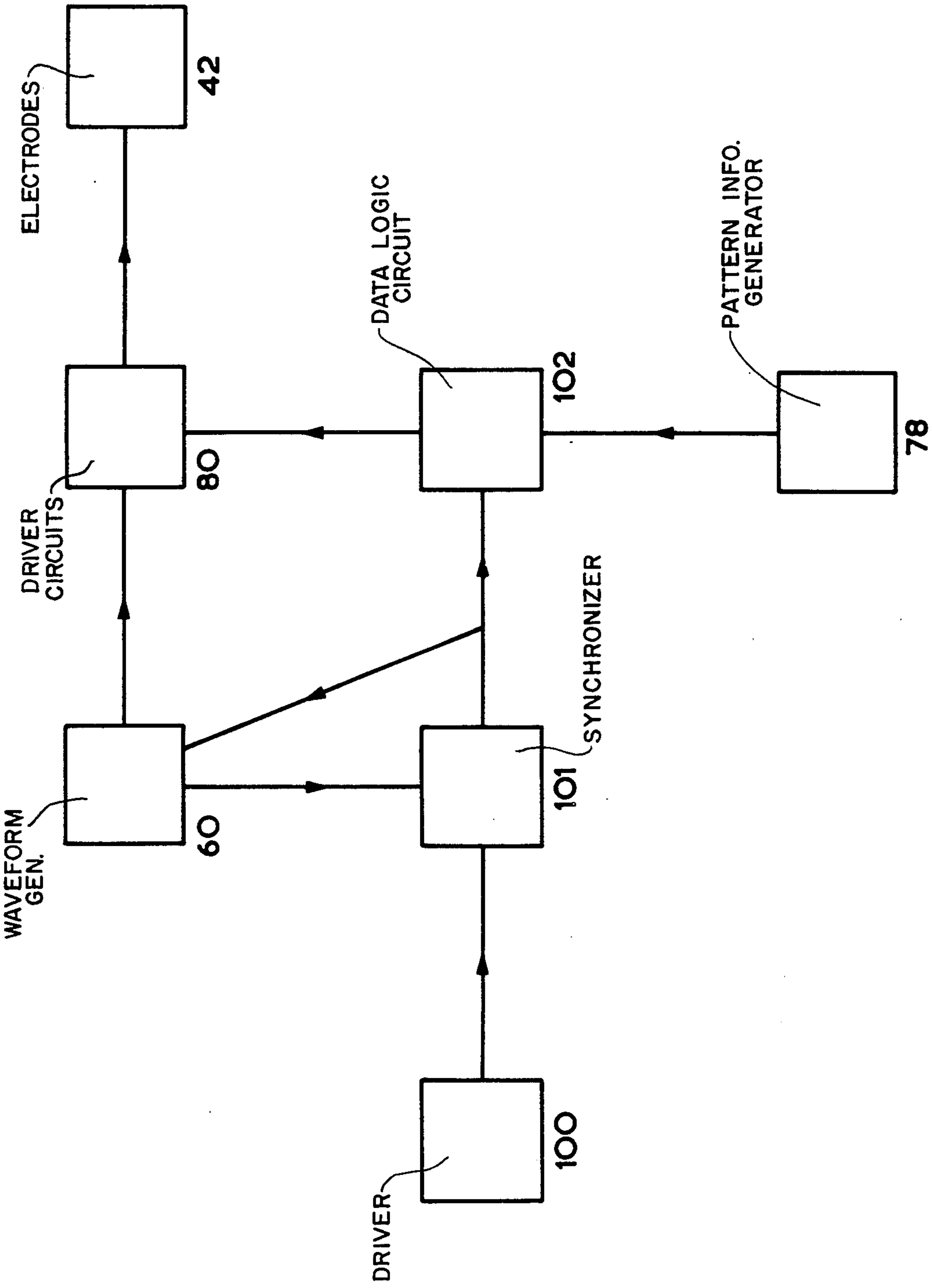

This invention relates to pattern printing apparatus and more particularly to such apparatus adapted to print by depositing on a surface to be printed during relative movement between the apparatus and the said surface successive rows of contiguous drops extending transversely to said direction of relative movement.

In U.K. Pat. No. 1354890 and U.S. application No. 455,724, now U.S. Pat. No. 3,956,756 there is described and claimed a pattern printing apparatus adapted to print by depositing small drops of printing liquid in accordance with a pattern information signal on a surface to be printed during relative movement between the apparatus and the said surface, comprising a row extending transversely to said direction of relative movement of printing guns, each gun having an orifice, printing liquid supply means for supplying printing liquid under pressure to the orifice to form a jet of printing liquid directed towards the location in the apparatus of the said surface, means for imparting regularly spaced variations in the cross-section of the jet to stimulate drop formation, charge electrode means located adjacent the position in the jet path of drop separation to effect charging of drops formed in the jet path, drop deflection means for providing a substantially constant electrostatic field through which pass the drops formed in the jet path thereby to deflect electrically charged drops to an extent dependent upon the charge levels on the drops, and a drop intercepting means for intercepting uncharged drops, characterised in that there are provided waveform generating means which make available to the charge electrode means of each printing gun a voltage waveform of constant period, the magnitude of said voltage at corresponding times during each period thereof being the same and the period being sufficient to span the formation of a plurality of drops in each jet path, and electrical means appropriate to control in accordance with the pattern information signal the application of said waveform, at moments appropriate to the charging of the drops during each period of said waveform, to charge electrode means of any of the printing guns thereby to determine whether drops formed in the jet paths of those printing guns are charged or not; further characterised in that in relation to the characteristics of the printing liquid used, the geometrical constants of each printing gun and its electrical operating parameters are chosen so that successive drops therefrom in any sequence formed during a period of the voltage waveform and charged for deposition on the said surface as well as corresponding drops in sequence formed in successive periods of the voltage waveform and charged for deposition on the said surface are deposited at a spacing to yield contiguous spots on the said surface, and further characterised in that the printing guns are arranged so that the set of drops produced by one gun during successive periods of the voltage waveform if charged for deposition on the said surface and the sets of drops produced by adjacent guns during successive periods of the voltage waveform, if charged for deposition on the said surface, are deposited at a spacing to yield contiguous spots over the entire surface to be printed, whereby the drops deposited from the different guns in successive periods of the voltage waveform are enabled to combine to form a contiguous pattern which may cover the whole surface.

Also in Belgian Patent No. 801757 there is described a modification of the above apparatus in which, instead of intercepting in the drop intercepting device uncharged drops formed in the jet path, there are intercepted those drops which have been charged by the charge electrode means at least to a predetermined level.

The stream of drops issuing from each printing gun is produced in the said apparatus by supplying printing liquid under pressure to each gun, and by causing the jet of printing liquid issuing from the orifice of each gun to break up into drops by the use of vibrations obtained, for example, by the energisation of a piezo-electric crystal. If all the drops produced by each printing gun are charged for deposition on the surface to be printed, then, in order that successive rows of drops produced on the surface to be printed are contiguous it is necessary that the speed of movement of the said surface through the apparatus is directly related to the frequency of formation of the drops, and can be conveniently represented by the formula:

$$\text{Speed (cms./second)} = X.d./n$$

wherein X is the number of drops per second produced by each printing gun.

*d* is the pitch of successive rows of drops deposited on the surface to be printed.

*n* is the number of drops which are formed per printing gun during each period of the voltage waveform.

During each cycle of the voltage waveform one complete row of drops is deposited across the width of the surface assuming that all the drops are charged for deposition on the surface. Thus during the period of one cycle of the voltage waveform the surface moves forward a distance d to permit the next row of drops to be deposited contiguously to the previous row.

Since in practice d and n are normally constant any variation in the speed of the surface can only be achieved by varying the number of drops formed in unit time. Whilst this can be achieved in principle by varying the pressure on the printing liquid supplied to each printing gun, non-linearities in the system can result in irregularities in the formation of the drops which can result in imperfections in the pattern being printed. Consequently in practice it is found undesirable to vary the number of drops formed in unit time by each printing gun. However the present invention enables the speed of the surface to be slowed down without varying the number of drops formed in unit time by each printing gun whilst still enabling rows of contiguous spots to be produced on the surface to be printed.

Accordingly the present invention relates to an improved droplet printing apparatus of the type wherein a succession of ink drops directed at regular intervals along the same flight path may be individually charged to one of a plurality of charge levels by application of a voltage waveform of constant period to groups of drops, each charged drop being deflected from the common flight path, by passage through an electric field, to an extent dependent on the charge carried whereby during relative motion between the apparatus and a surface to be printed said ink drops may be deposited in successive rows on said surface extending transversely to the direction of relative movement by repeated application of said voltage waveform to successive groups of ink drops, those drops not destined to be printed receiving a charge which causes them to be directed into a drop intercepting means, in which the improvement comprises means for introducing a delay, equal to an integral multiple of the drop interval, between adjacent voltage waveforms of constant period and means to ensure that during such delay all the drops formed are directed into said drop intercepting means.

The drop interval is the period between the formation of adjacent drops in a drop stream which is the inverse of the drop frequency (1/X).

If the number of drops produced during each delay period is represented by m then the speed of the surface (cm./sec.) can now be represented by the formula $(Xd)/(m + n)$ where the symbols have the above defined meanings. However this expression permits only a series of discrete values of the surface speed whereas the surface speed can in fact be varied continuously. If the surface speed (V) is gradually reduced from a specific value $V_m$ which corresponds to a delay during which m drops are formed to a value $V_1$ which is intermediate between $V_m$ and $V_{1+1}$, at which speed the delay corresponds to the formation of $m + 1$ drops, the delay period will end during the formation of the $(m + 1)$ th drop. However the voltage waveform cannot be initiated during the formation of a drop and therefore initiation of a new waveform and appropriate pattern data must wait until the $(m + 1)$ th drop period is complete whereupon the $(m + 2)$ th drop becomes the first of the new pattern row.

Under these circumstances the delay extends as to m + 1 drops during which the surface travels a distance $d_1$ which is greater than the distance d which it would have travelled had the surface been travelling at speed $V_{m+1}$. However the maximum value of $d_1$-$d$ is less than $d/n$ which is the distance the surface travels during the formation of one drop.

In the apparatus described in U.K. Patent No. 1354890 the number of drops ($n$) formed during one period of the voltage waveform is 16 and thus the maximum effect of a continuous change of surface speed is that the interrow pitch ($d$) increases by less than 1/16 th of its normal value. The rows will therefore remain effectively contiguous although the pattern will actually be slightly less dense in shade.

The voltage waveform of constant period can be in the form of a staircase waveform of constant period as depicted in FIG. I of the accompanying drawing which represents three successive waveforms each of which corresponds in time to the formation of $n$ drops.

FIG. II of the accompanying drawings depicts three similar waveforms but in this case instead of being formed successively as in FIG. I a delay corresponding in time to the formation of $m$ drops is introduced between each waveform.

The operation of the previously described printer will now be described with reference to FIG. III which is a block diagram of the printer control circuits.

In U.K. Patent Specification No. 1354890 there is described an apparatus in which a pattern information generator converts pattern data, in the form of multibit words, into electronic signals which are used to apply, via driver circuits, the voltage waveform of constant period from a voltage waveform generator to the charge electrode means so as to determine whether a particular drop of ink is directed into the drop intercepting means or alights on the surface to be printed in the correct position.

In the present modification there is provided a synchroniser 101 which has one electrical input connection from a surface drive mechansim 100 which provides the relative motion between the printing apparatus and the surface to be printed, and a second electrical input connection from the voltage waveform generator 60. The synchroniser 101 also has two output connections, one to the voltage waveform generator 60, and the other to a data logic circuit 102.

The data logic circuit 102 also has an electric input connection from the pattern data generator 78 and an electrical output connection to the driver circuits 80. The driver circuits 80 also have an electrical input connection from the voltage waveform generator 60 and an electrical output connection to the charge electrode means 42.

On receipt of signals from both the surface drive mechanism 100 indicating that the surface to be printed has moved through a predetermined distance and from the voltage waveform generator 60 at the end of each voltage waveform, the synchroniser 101 produces an output signal which resets the voltage waveform generator 60 (i.e. it permits the formation of a new voltage waveform) and which is also fed to the data logic circuit 102 where it permits the passage of pattern information from the pattern information generator 78 to the driver circuits 80.

If the output signal from the surface driver mechanism 100 to the synchroniser 101 is absent then the synchroniser 101 produces no output signal. Thus the voltage waveform generator 60 is not reset and simultaneously the data logic circuit 102 inhibits the feed of pattern data to the driver circuits 80 and substitutes for the pattern information, signals which allow the driver circuits 80 to apply to the charge electrodes 42 voltages which correspond either to zero or to a first level voltage so that all drops passing through the electrode at that time are charged to an extent which causes them to be collected in the drop intercepting means. Since the synchroniser 101 will not produce an output unless it receives signals from both the surface drive mechanism 100 and the voltage waveform generator 60 should the surface drive mechanism 100 move the surface through the printer at such a rate that the surface moves a distance d within the period of a voltage waveform then the initiation of a new pattern and formation of a new voltage waveform will be held up until the previous voltage waveform is complete. This will have the effect of slightly modulating the printing density but avoids the possibility of cutting short the voltage waveform and therefore the deposition of drops (in a coloured area of the pattern) which would produce a longitudinal unprinted stripe on the surface.

As stated previously $d$, being the pitch of successive rows of drops on the surface to be printed, is normally constant and the surface drive mechanism is set to produce an output signal each time the surface has moved forward a distance $d$ so that contiguous rows of drops are produced on the surface to be printed. However, as a modification of the present invention, if the signal is produced each time the surface moves forward a distance $d/r$ where $r$ is positive and greater than 1 then the rows of drops will overlap by a margin of $(1 - 1/r)$ and a heavier depth of shade will thus be produced on the surface. If on the other hand $r$ is positive but less than 1 then the rows of drops will not be contiguous and with reducing values of $r$ an increasing gap will be formed between the rows of drops. This will have the effect of producing a lighter depth of shade on the surface.

What we claim is:

1. A circuit for controlling printing apparatus of the type adapted to print by depositing small drops of printing liquid in accordance with a pattern information signal on a surface to be printed during relative movement caused by surface drive means between the apparatus and said surface, comprising a row of printing guns extending transversely to said direction of relative movement, each gun having an orifice, printing liquid supply means for supplying printing liquid under pressure to the orifice to form a jet of printing liquid directed towards the location in the apparatus of the said surface, means for imparting regularly spaced variations in the cross section of the jet to stimulate drop formation, charge electrode means located adjacent the position in the jet path of drop separation to effect charging of drops formed in the jet path, drop deflection means for providing a substantially constant electrostatic field through which pass the drops formed in the jet path thereby to deflect electrically charged drops to an extent dependent upon the charge levels on the drops, and drop intercepting means for intercepting uncharged drops, said circuit comprising waveform generating means for making available to the charge electrode means of each printing gun a voltage waveform of constant period, the magnitude of said voltage at corresponding times during each period thereof being the same and the period being sufficient to span the formation of a plurality of drops in each jet path, electrical means for controlling in accordance with the pattern information signal the application of said waveform, at moments appropriate to the charging of the drops during each period of said waveform, to charge electrode means of any of the printing guns thereby to determine whether drops formed in the jet paths of those printing guns are charged or not, and a synchronizer for producing, in response to a first input signal from the surface drive means indicating the movement of said surface through a predetermined distance and a second input signal from said waveform generating means at the end of each of said waveforms, an output signal initiating the formation of the next of said waveforms and permitting the passage of the pattern information to said electrical means.

* * * * *